United States Patent [19]

Dunn

[11] Patent Number: 5,040,817
[45] Date of Patent: Aug. 20, 1991

[54] TRAILER HITCH ASSEMBLY

[76] Inventor: Richard P. Dunn, 4701 Sisk Rd., Wichita Falls, Tex. 76310

[21] Appl. No.: 538,919

[22] Filed: Jun. 18, 1990

[51] Int. Cl.$^5$ .................................. B60D 1/06
[52] U.S. Cl. ........................... 280/511; 280/504
[58] Field of Search ............ 280/504, 506, 511, 512, 280/513; 184/105.1, 105.3

[56] References Cited

U.S. PATENT DOCUMENTS

| | | | |
|---|---|---|---|
| 2,093,761 | 9/1937 | Kramer | 280/511 |
| 2,150,010 | 3/1939 | Solomon | 280/511 |
| 2,297,182 | 9/1942 | Weiss | 280/511 |
| 2,392,063 | 1/1946 | Reimann et al. | 280/511 |
| 2,768,848 | 10/1956 | Mitchell et al. | 280/511 |
| 3,097,722 | 7/1963 | Asire | 184/105.1 |
| 3,433,503 | 3/1969 | Davis | 280/512 |
| 3,436,101 | 4/1969 | Hanson | 280/511 |
| 3,630,546 | 12/1971 | Church | 280/511 |
| 4,060,331 | 11/1977 | Domer et al. | 280/511 |
| 4,201,400 | 5/1980 | Hoogenbosch | 280/511 |
| 4,293,056 | 10/1981 | Setree, II | 184/105.3 |
| 4,444,410 | 4/1984 | Martin | 280/511 |
| 4,522,421 | 6/1985 | Vance | 280/511 |
| 4,832,360 | 5/1989 | Christian | 280/511 |
| 4,889,356 | 12/1989 | Morris | 280/511 |

Primary Examiner—Mitchell J. Hill
Assistant Examiner—Michael Shaughnessy
Attorney, Agent, or Firm—Head & Johnson

[57] ABSTRACT

An improved trailer hitch assembly to be attached to a drawbar for towing a trailer, the assembly including an upright elongated hitch post threaded at the lower end by which it is attached to a drawbar, the upper end being of cylindrical external configuration and the post having a central passageway therein communicating with the bottom end, a grease fitting threadably received in an opening in the bottom end communicating with the passageway and the upper end of the passageway communicating with the external cylinder surface, and a ball having an opening therethrough rotatably received on the hitch post and a keeper ring secured to the upper end of the hitch post to retain the ball in position, grease being deposited from the grease fitting through the passageway to lubricate the cylindrical surface between the hitch post and the ball.

7 Claims, 1 Drawing Sheet

TRAILER HITCH ASSEMBLY

SUMMARY OF THE INVENTION

The most commonly employed means for hitching a trailer to a car, truck or the like is by means of a hitch ball. The typical hitch ball is a unitary member having a ball at the upper end and threads at the lower end. The lower threaded end extends through an opening in a horizontally extending drawbar, and by means of a bolt the hitch ball is secured to the drawbar. The trailer hitch has a semi-spherical recess which fits down over the ball. The trailer hitch is rotatable with respect to the ball. When a vehicle turns a corner or goes over a rise or into a recess causing the trailer to turn or tilt relative to the vehicle, the change in attitude between the trailer and the vehicle are accommodated by the trailer hitch semi-spherical surface rotating on the ball exterior surface.

To prevent wear between the external surface of the trailer hitch ball and the trailer semi-spherical recess, lubrication must be applied, usually to the exterior surface of the ball. When the trailer is removed the ball is exposed and the lubrication thereon can become a problem, since any contact with the lubricated ball causes grease to be transferred to the user's clothing. In addition, the ball exterior surface is exposed to the weather so that in many cases it is necessary to lubricate the ball each time a trailer is to be utilized on the hitch.

The present disclosure is directed toward an improved trailer hitch assembly which eliminates the need for lubrication on the exterior of a trailer hitch ball and which provides other advantages.

For background information relating to prior art pertaining to trailer hitch assemblies and particularly trailer hitch ball devices, reference may be had to the following U.S. Pat. Nos. 2,093,761; 2,150,010; 2,392,063; 2,297,182; 3,436,101; 4,201,400; 4,444,410; 4,522,421; and 4,889,356.

The improved trailer hitch assembly of this disclosure is adapted to be attached to a drawbar extending generally horizontally from a towing vehicle, whether on an automobile or a truck. The drawbar has a vertical opening through it.

The trailer hitch assembly includes an upstanding elongated hitch post that has an upper end and a lower end. Threads are provided on the exterior of the hitch post adjacent and extending to the lower end. The lower end is receivable within the opening of the drawbar. By means of a nut, preferably used with a lock washer, the hitch post can be thereby secured to a drawbar.

The upper end of the hitch post is of cylindrical external configuration. Formed within the interior of the hitch post is a small diameter passageway which communicates with the lower end and with external cylindrical surface area at the upper end of the hitch post. Threadably received within a threaded recess in the lower end of the hitch post is a grease fitting that communicates with the passageway.

A ball having a cylindrical opening therethrough is rotatably received on the hitch post upper cylindrical surface. The ball preferably has an enlarged internal diameter recess co-axial with the cylindrical opening therethrough at, what may be termed, the "upper end of the ball."

The ball is rotatably positioned on the hitch post upper cylindrical portion. The hitch post has a reduced diameter circumferential recess adjacent the upper end. When the ball is rotatably positioned on the hitch post a washer is positioned on the hitch post and a keeper ring is snapped into the circumferential recess to retain the ball in rotatable position on the hitch post.

In the preferred arrangement, the hitch post has an intermediate enlarged external diameter portion. This enlarged external diameter portion preferably is in two parts, the lower part being generally cylindrical but having opposed wrench flats thereon. These wrench flats are useful when securing the nut to the lower threaded end of the hitch post as it is attached to a drawbar. The upper portion of the enlarged diameter intermediate portion of the hitch post is preferably frusto-conical, that is, tapering upwardly from the lower cylindrical portion toward the reduced diameter cylindrical portion at the upper end of the hitch post. The ball has a flat surface coincident with the cylindrical opening therethrough at the end of the ball opposite the enlarged internal diameter recess previously mentioned. This flat surface fits on an upper ledge formed by the upper end of the frusto-conical enlarged external diameter portion of the hitch post at the intersection with the upper cylindrical portion.

The improved hitch assembly provides an arrangement wherein the application of lubrication to the external surface of the ball is unnecessary since the ball itself will rotate as the vehicle pulling the trailer turns with respect to the trailer. Further, the lack of requirement of lubrication on the external surface of the ball reduces the possibility of the trailer becoming dislodged from the ball so that thereby improved safety is obtained.

A better understanding of the invention will be had by reference to the following description and claims taken in conjunction with the attached drawings.

DESCRIPTION OF THE PREFERRED EMBODIMENT

Figure 1:
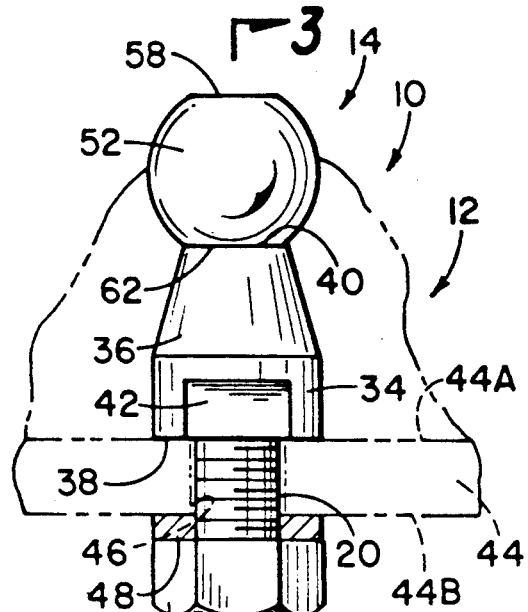
FIG. 1 is an elevational view of an improved trailer hitch assembly showing the trailer hitch assembly mounted on a drawbar and showing the drawbar in dotted outline in cross-section to fully reveal the hitch assembly.
Figure 2:
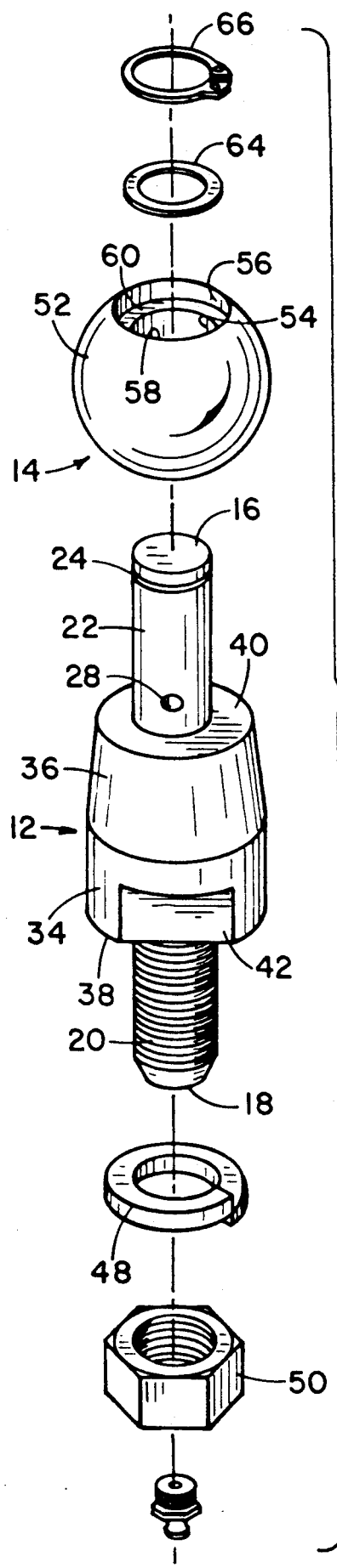
FIG. 2 is an exploded view of the trailer hitch assembly of FIG. 1, the drawbar not being shown.
Figure 3:
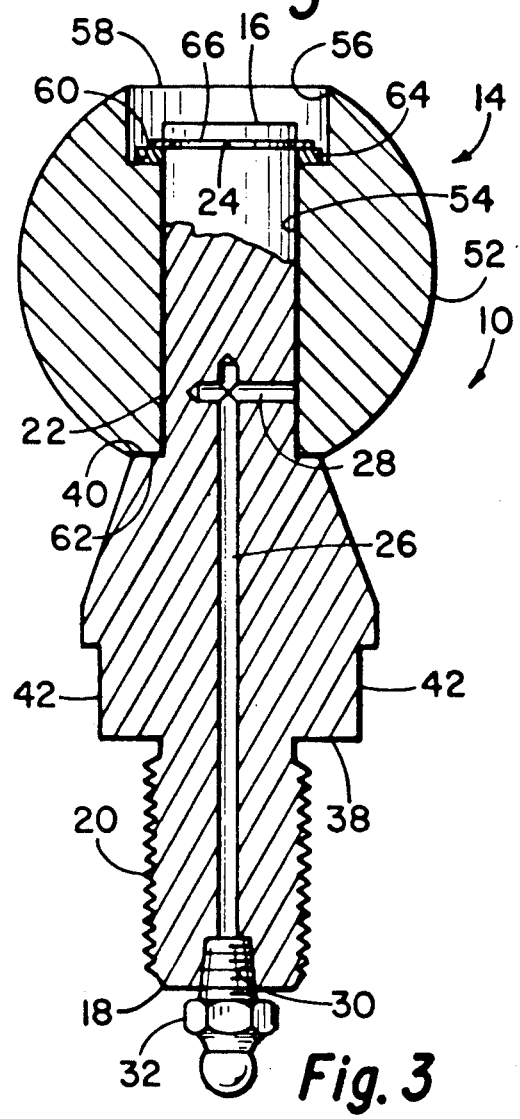
FIG. 3 is a cross-sectional view of the trailer hitch assembly, the drawbar not being shown, as taken along the line 3—3 of FIG. 1.

Referring to the drawings, the trailer hitch assembly is generally indicated by the numeral 10 in FIGS. 1 and 3. The hitch assembly includes two major components, that is, an upright elongated hitch post, generally indicated by the numeral 12, and a ball, generally indicated by the numeral 14. The hitch post has an upper end 16 and a lower end 18. The hitch post is cylindrical adjacent the lower end 18 and provided with threads 20.

The portion adjacent the upper end 16 is of external cylindrical shape and the cylindrical surface is identified by the numeral 22. Adjacent the upper end 16 is a circumferential recess 24.

As shown best in FIG. 3, a small diameter passageway 26 is formed in the stem communicating with the lower end 18. A branch passageway 28 extends to the cylindrical surface 22. Formed in the lower end 18 is a threaded recess 30 that receives the threaded end portion of a grease fitting 32, the grease fitting communicates with passageways 26 and 28. By means of grease fitting 32 grease may be forced through the passageways and out of the external cylindrical surface 22.

The hitch post 12 is further preferably defined by an enlarged external diameter intermediate portion, and such intermediate portion encompass a lower cylindrical portion 34 and an upper frusto-conical portion 36.

The lower cylindrical portion 34 forms, at the juncture with the smaller diameter threaded portion 20, a lower horizontal ledge 38. The upper frusto-conical portion 36 forms an upper horizontal ledge 40 where it meets the upper cylindrical portion 22.

The hitch post intermediate portion lower cylindrical portion 34 is provided with opposed wrench flats 42.

FIG. 1 shows, in dotted outline, a portion of a horizontally extending drawbar 44 that has a flat upper surface 44A and a flat lower surface 44B. The drawbar has a vertical opening 46. The hitch post is secured to the drawbar by the insertion of the lower reduced diameter threaded portion 20 through the opening 46. A lock washer 48 is positioned on threaded portion 20 and then a nut 50 is tightened on threaded portion 20. The hitch post lower horizontal ledge 38 rests securely on the drawbar upper horizontal surface 44A.

Ball 14 has a spherical external surface 52 and an opening 54 therethrough, opening 54 being slightly larger in internal diameter than external diameter of the post cylindrical portion 22.

Ball 14 further has an enlarged internal diameter short-depth opening 56 which truncates the spherical surface and provides, what may be termed, as ball top 58. This enlarged internal diameter recess 56 provides an internal ledge 60 at the juncture with cylindrical opening 54. The opposed end of the ball has a flat surface area 62. When the ball is positioned on the hitch post, as shown in FIGS. 1 and 3, flat surface 62 rests rotatably on the hitch post upper horizontal surface 40.

To retain ball 14 in position on the hitch post cylindrical portion 22, a washer 64 is positioned over the hitch post top end 16. An expandable keeper ring 66 is then positioned within the circumferential recess 24 to thereby secure the ball in position on the hitch post.

It can be seen that ball 14 is rotatable relative to the hitch post, and that by the passageway of grease through fitting 32 and passageways 26 and 28, the surfaces of the ball, rotating against the hitch post, can be lubricated as required. In this manner, when a trailer hitch having a semi-spherical recess (not shown) is positioned over the trailer hitch ball and the trailer hitch secured to the trailer hitch ball, the ball is free to rotate as the attitude of the trailer changes with respect to the towing vehicle, with the rotatory motion occurring between the ball and the hitch post cylindrical surface 22. Therefore, it is not necessary that lubrication be applied to the external surface 52 of the ball. Stating it another way, if the external surface 52 is dry excess wear between the ball and the semi-spherical recess of the trailer hitch will not be a serious factor since all of the rotary motion in the horizontal plane will be absorbed.

Eliminating the need to provide lubrication on the external surface 52 of the ball is highly advantageous. First, by eliminating the need for lubrication at this area the disadvantage of having a lubricated area exposed when a trailer is not secured to a towing vehicle is eliminated. Further, since lubrication on the external surface 52 of the ball is easily wiped away when the ball is exposed, it is normally necessary that lubrication be applied to a ball each time a trailer hitch is affixed to it. An advantage of the trailer hitch assembly of this disclosure is that lubrication need only infrequently be applied through grease fitting 32, since the lubricated surfaces are not exposed and lubrication will stay in position for a substantial length of time.

Another advantage of the trailer hitch assembly of this disclosure is that ball 14 may be easily removed and replaced with another ball without removing the hitch post. This is accomplished by removing the keeper ring 66, after which the ball can be removed and replaced immediately with a ball having a different size. This permits the same trailer hitch post 12 to be utilized with various diameter balls to accommodate various types of trailer hitches.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved trailer hitch assembly adapted to be attached to a drawbar for towing a trailer, the drawbar having an opening therethrough, the assembly comprising:
    an upstanding elongated hitch post having an upper and a lower end and having threads adjacent said lower end, the lower end being receivable in an opening in a drawbar;
    means to retain said hitch post securely uprightly from a drawbar, said hitch post having a portion at said upper end of cylindrical external configuration having a cylindrical external surface, the hitch post having a passageway therein communicating between one of said hitch post ends and said post external cylindrical surface;
    a grease fitting means received in said passageway in said hitch post at one of said hitch post ends providing means for conveying grease through said passageway;
    a ball having an opening therethrough dimensioned to rotatably receive said hitch post portion having said external cylindrical surface, the ball being rotatably received on said hitch post; and
    means of removably retaining said ball on said portion of said hitch post having said cylindrical surface.

2. An improved trailer hitch assembly according to claim 1 wherein said hitch post is defined by a first portion adjacent said lower end, a second portion adjacent to said upper end and an intermediate portion, said second portion having said ball receiving external cylindrical surface; and said intermediate portion being of increased external configuration and providing a horizontal lower ledge between said hitch post lower end and said intermediate portion for resting on a drawbar and a horizontal upper ledge between said intermediate and upper end for supporting said ball thereon.

3. An improved trailer hitch assembly according to claim 2 wherein said means of removably retaining a ball on said hitch post includes a circumferential recess formed in said hitch post exterior cylindrical surface adjacent said upper end; and an expandable circumferential key removably received in said circumferential recess.

4. An improved trailer hitch assembly according to claim 3 wherein said opening through said ball has an increased internal diameter portion, said key being received on said hitch post within said increased internal diameter portion of said opening through said ball.

5. An improved trailer hitch assembly according to claim 2 wherein said hitch post intermediate portion is defined by a lower, generally cylindrical portion and an upper truncated conical portion.

6. An improved trailer hitch assembly according to claim 5 in which said lower generally cylindrical portion on said hitch post intermediate portion has opposed wrench engageable flats thereon.

7. An improved trailer hitch assembly according to claim 1 wherein said hitch post has an increased external dimensioned intermediate portion below said cylindrical external surface portion providing a circumferential ledge and wherein said ball has an annular flat surface thereon surrounding said cylindrical opening, the ball annular flat surface resting on and being rotatably supported by said hitch post circumferential ledge.

* * * * *